United States Patent [19]

Cole

[11] 4,215,341

[45] Jul. 29, 1980

[54] INTRUSION OR MOVEMENT DETECTOR

[76] Inventor: Martin T. Cole, 3 David St., East Bentleigh, Victoria, Australia

[21] Appl. No.: 870,603

[22] Filed: Jan. 18, 1978

[30] Foreign Application Priority Data

Jan. 19, 1977 [CA] Canada ................................. 270056

[51] Int. Cl.² ............................................. G08B 13/24
[52] U.S. Cl. ..................................... 340/552; 331/65; 340/553; 343/5 PD
[58] Field of Search ...................... 340/552, 553, 568; 343/5 PD, 7.7; 331/65; 325/67; 324/5

[56] References Cited

U.S. PATENT DOCUMENTS

| | | | |
|---|---|---|---|
| Re. 25,100 | 12/1961 | Chapin | 343/5 PD |
| 3,691,556 | 12/1972 | Bloice | 340/553 |
| 3,828,335 | 8/1974 | Salmut | 340/552 |

*Primary Examiner*—Glen R. Swann, III
*Attorney, Agent, or Firm*—Learman & McCulloch

[57] ABSTRACT

An intrusion or movement detector including an oscillator for generating a radio signal, an antenna for transmitting said radio signal into an area to be surveyed by said detector, said antenna exhibiting a variable radiation resistance relative to the position and movement of objects in the area to be surveyed resulting in a variable loading on said generator when in use, a monitor for monitoring said variable loading and activating a signal or alarm when said variations in loading reach a predetermined threshold level to indicate an intrusion or movement in the area surveyed.

5 Claims, 7 Drawing Figures

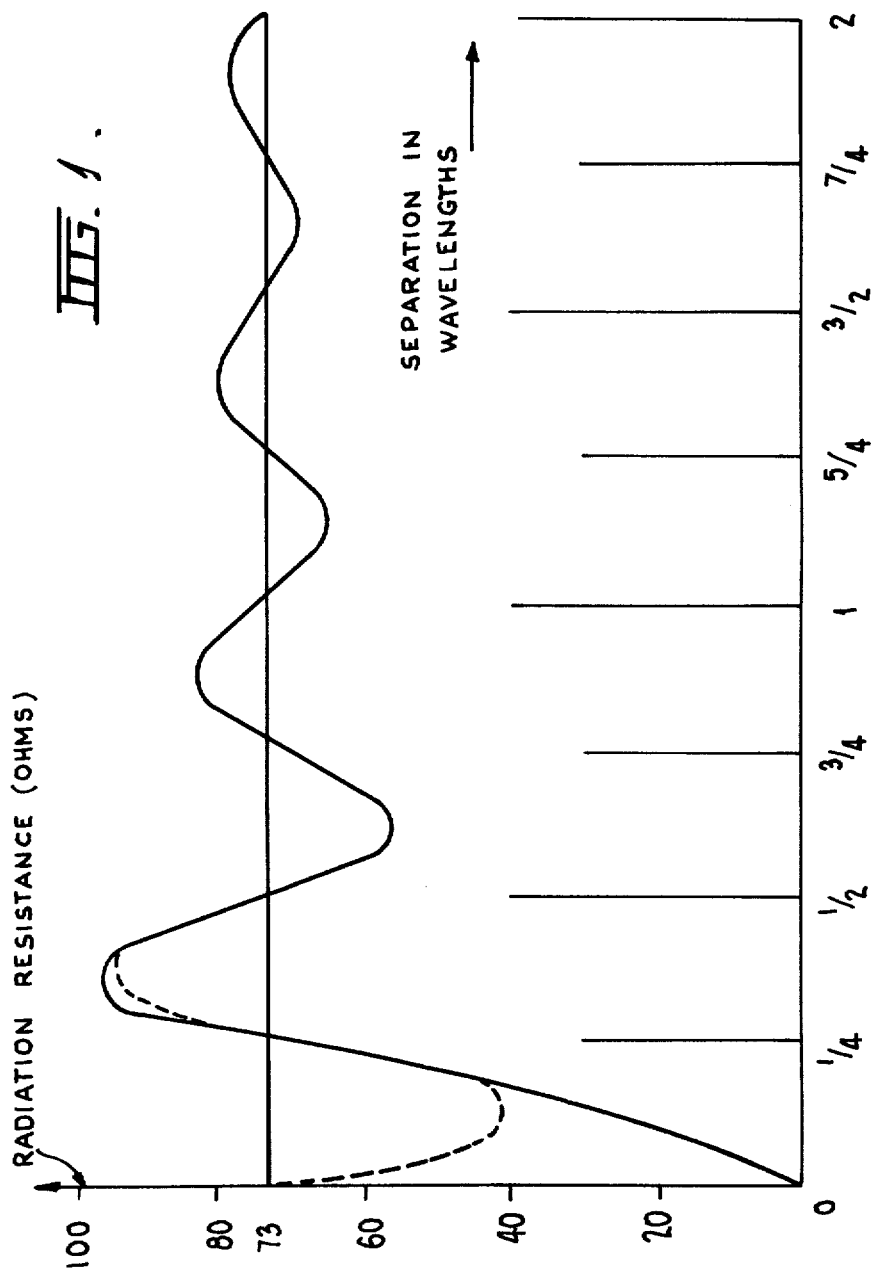

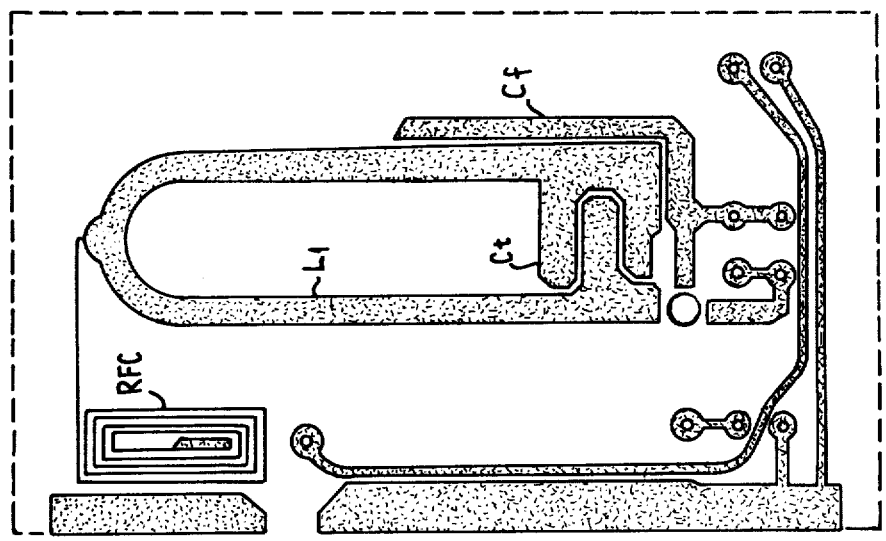
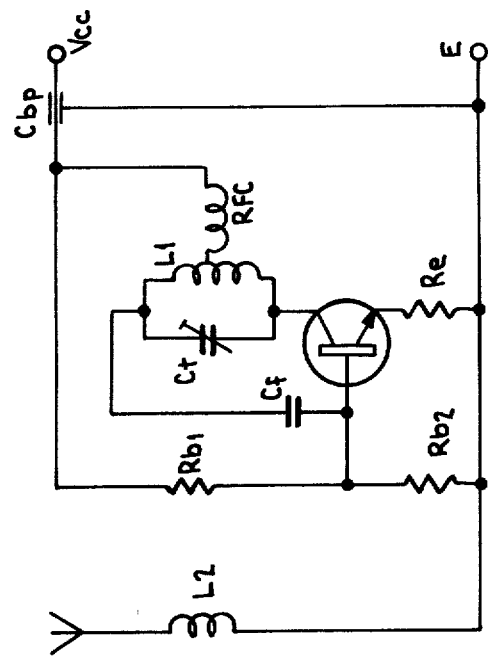
FIG. 3.
FIG. 2.

INTRUSION OR MOVEMENT DETECTOR

This invention relates to an intrusion or movement detector utilizing the transmission of an ultra-high frequency radio signal for the purpose of detecting moving objects in a manner which permits stable operation and rejection of interference. This stability and interference rejection overcomes false activation of the detector.

BACKGROUND OF THE INVENTION

Intrusion detectors operating within the UHF region of radio transmission are known for the detection of the movement of objects (preferably human) within an area of coverage. However, all such designs possess inherent causes of instability. A fundamental redesign of the method by which such detectors operate, has resulted in this invention.

Previously known detectors have incorporated an oscillator circuit comprised of one or move valves or transistors. This oscillator is coupled to an antenna. This antenna is used both for transmission and reception of the radio signal derived from the oscillator. The transmitter signal fills the area of coverage and is reflected back off each object within the area. This reflected signal is received on the antenna. Due to the phenomenon of the Doppler effect, if an object within the area is moving, then the frequency of the reflected and received signal will be different from the frequency which was transmitted. These transmitted and received signals are mixed at the antenna to produce the Doppler difference frequency; corresponding to the difference between the transmitted and received frequencies.

The usual method for obtaining this Doppler difference frequency is to use a mixing detector diode. This diode connects to a pickup loop coil. This coil is connected at one end to the antenna and at the other end to chassis earth, while the diode connects to a centre tap. In some configurations, two coils and two diodes are used in a balanced configuration. Other configurations have been tried which employ the diode connected to the oscillator tank coil.

There are three major limitations of this design. Firstly, variations in the quality of the diode from product to product cause changes in the range of area coverage attainable, causing problems in production quality control. Secondly, for satisfactory operation of the diode, relatively high transmitter power is required, which can in turn give rise to interference to other receivers operating on the same frequency (including other UHF movement detectors). Thirdly, the use of a receiver makes the detector vulnerable to the reception of interfering radio signals from any other type of transmitter (e.g. taxi radio).

Furthermore, this receiver is of very broad band reception which exacerbates the likelihood of receiving interference. This broadness of bandwidth is caused by the low Q of the antenna loop or tank coil, and cannot be improved without relatively complex double or triple conversion techniques.

Other aspects requiring improvement relate to the amplification and processing of the signal derived from the transmitter.

BRIEF DESCRIPTION OF THE DRAWINGS

FIG. 1 is a graph showing radiation resistance against "target" separation,

FIG. 2 shows a typical oscillator circuit as used in the invention,

FIG. 3 shows the printed circuit of the oscillator of FIG. 2.

DESCRIPTION OF THE INVENTION

Figure 4A:
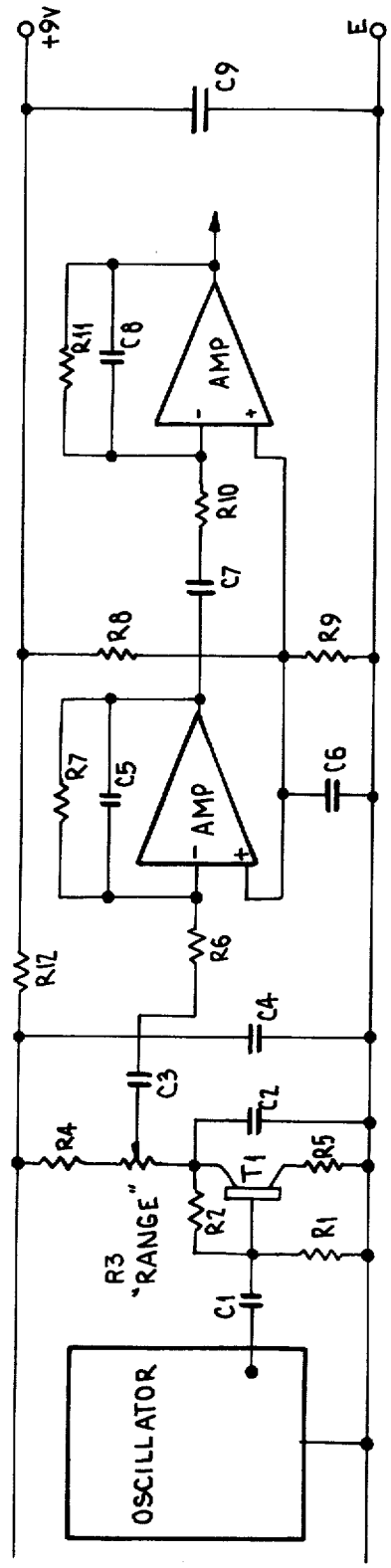
FIGS. 4a and 4b are a circuit diagram of the detector circuitry.

There is incorporated within the invention an oscillator coupled to an antenna. There is no receiver. The Doppler effect is not employed. The oscillator causes a radio signal to be transmitted from the antenna, into the area of coverage. The characteristic radiation resistance of the antenna is affected by the environment into which it is loaded. Thus, objects within the area will affect the radiation resistance and thus will determine the amount of power radiated by the antenna. By this mechanism, the loading on the oscillator itself is influenced by the position and nature of the objects within the area. Should an object change its position, then the antenna loading, and hence the oscillator loading, will change. Should an object within the area be moving, then the loading will change in sympathy with that motion. Accordingly the invention incorporates means for monitoring changes in oscillator loading over a period of time.

The invention provides an intrusion or movement detector comprising a means such as an oscillator for generating a radio signal, an antenna or like radiator coupled to said radio signal generating means for transmitting a radio signal into an area to be surveyed by said detector, said radiator exhibiting a variable radiation resistance relative to the position and movement of objects (if any) in the area to be surveyed resulting in a variable loading on said generator when in use, means for monitoring said variable loading such that when said variations in loading reach a predetermined threshold level said monitoring means activates a signal or alarm means indicating detection of an intrusion or movement in the area surveyed.

In the preferred embodiment of the invention there is comprised a transistor oscillator wired as in FIG. 2. Coupling to the antenna is made inductively between the antenna coil (L2) and the oscillator tank coil (L1). The monitoring of changes in oscillator loading is achieved by measurement of the changes in voltage occurring across the emitter resistor (Re), which occur as a consequence of changes in collector current.

Because the detector operates on the principle of antenna loading, then the range of detection is essentially independent of transmitted power. The radiation resistance is a function of the environment and not the power transmitted. Therefore, it is possible to operate on very low transmitted power levels, in the microwatt region. This overcomes the likelihood of interference being caused by the detector to any other receiver located in the vicinity.

The antenna is loosely coupled to the oscillator so that very little change in frequency (i.e. "frequency pulling") is caused by changes in antenna loading. This pulling is further minimised by use of an end-fed half wave-length whip antenna, such that the antenna loop is matched to a high impedance. There results a signal which varies in amplitude but not in frequency as a result of motion within the area.

This loose coupling of the oscillator to the environment results in a high degree of stability. Designs which require relatively high power transmission and close coupling to the environment result in significant frequency pulling and great susceptibility to instability.

Figure 6:
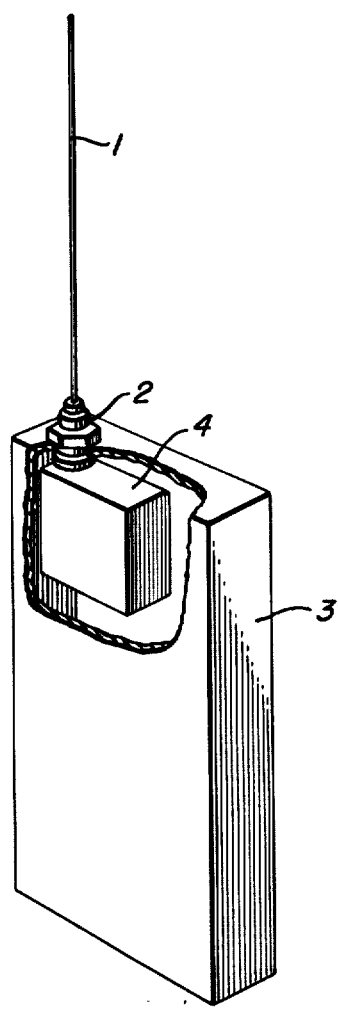
FIG. 6 shows the relationship between the case structures and the antenna.

Another contributor to instability is the coupling of radio frequency energy from the oscillator to the amplifying circuitry. This instability is caused by positive feedback of the radio signal, which is rectified (detected) due to non-linearity within the amplifier. This problem is so great that other designs have required the complete physical separation of the antenna section from the amplifying and/or signal processing sections. This problem has been overcome in the invention in three ways. Firstly, the transmitted power is very low. Secondly, as seem in FIG. 6, the oscillator is completely encased in a sealed metal box 4. Connections between the oscillator and amplifier are made via feedthrough capacitors of special design. Thirdly, the antenna 1 couples from the oscillator via a socket 2 which prevents radiation of the radio energy within the outer case 3 of the product. In this way the outer case forms the "earthy" radiator of a coaxial dipole antenna, with zero electric field inside.

Further refinement within the preferred embodiment of the oscillator have been the use of stripline techniques. The oscillator tank coil (L1), and the choke (RFC), the tuning capacitor (Ct) and the feedback capacitor (Cf) are all formed as part of a printed circuit, as illustrated in FIG. 3. This allows for a very simple design of low cost, yet a high degree of quality control is achieved. Repeatability of resonant frequencies is so good that the need for adjustable tuning elements is not required.

Suitable reconfiguration of the oscillator would result in the output of two signals of differing phase, which after amplification and signal processing would permit the identification of the direction of motion taking place within the area (refer to U.S. Ser. No. 850,270 filed Nov. 10, 1977).

It can be seen from FIG. (1) that motion progressing in a radial direction from the antenna, will result in a sinusoidal variation in radiation resistance, and hence the signal output from the oscillator to the amplifier will be sinusoidal. The period of this sinusoid will be dependent on the time taken for the object to move through a distance equal to a half-wavelength at the transmitted frequency. Thus, the frequency of the amplified signal will indicate the velocity of the object.

Control of bandwidth of the amplifier is therefore used to prevent detection of very fast or very slow movements, as one means for preventing false activation of the detector.

In the preferred configuration of the detector, there is provided a gain adjustment configured as a "range control", to determine the total area of coverage. Signal processing circuitry after the amplifier is used to integrate the distance travelled by the object within the area. If a certain distance is exceeded by the object then the output of the detector is activated. This distance is adjustable by means of a "sensitivity" control, to enable the detector to be adjusted in accordance with various environments.

DESCRIPTION OF THE CIRCUITRY

Figure 4B:
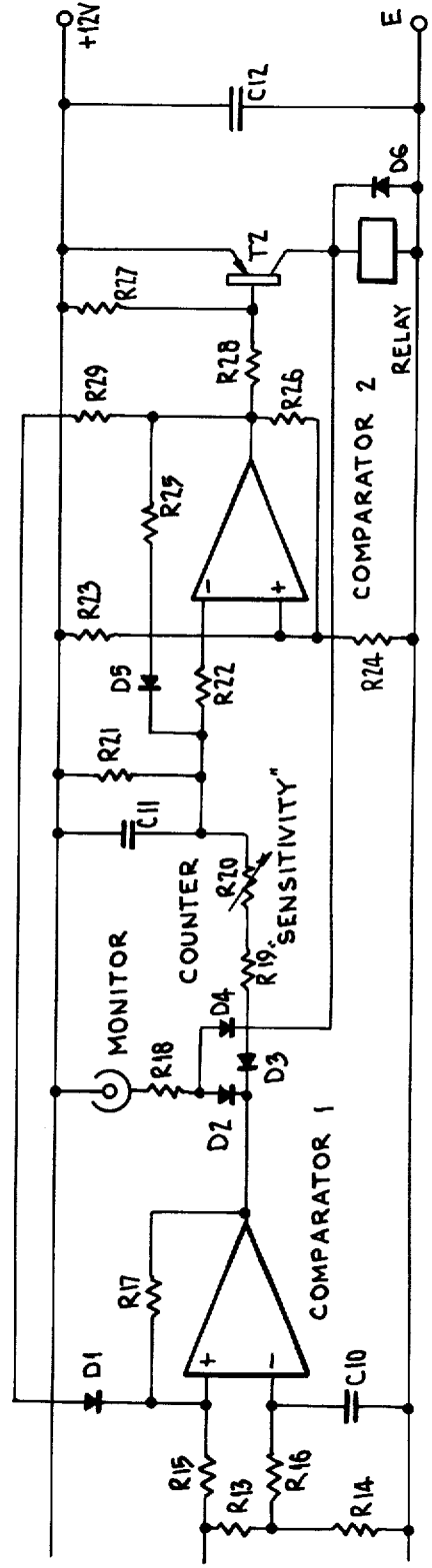
Figure 5:
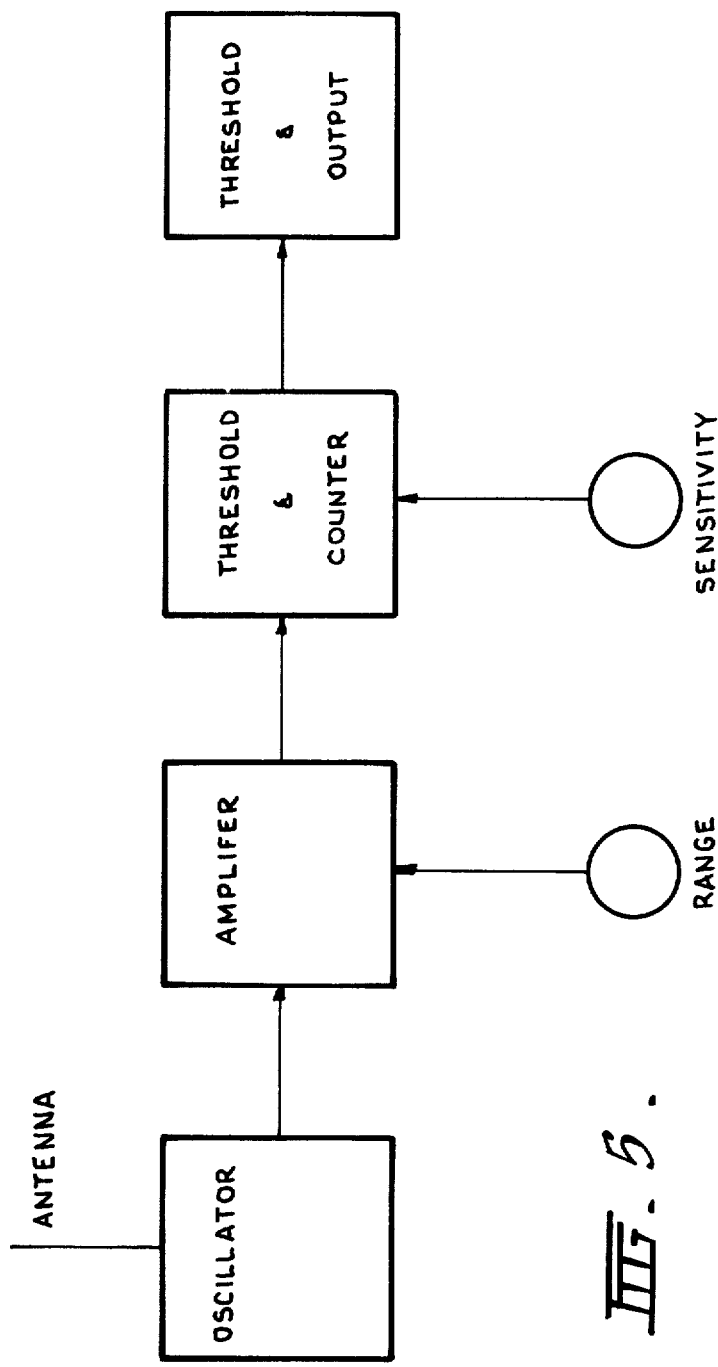
FIG. 5 is a block diagram showing the relationship of the basic circuit components.

FIGS. 4a and 4b show details of the preferred embodiment of the electronic circuitry.

Signal output from the oscillator (FIG. 2) is coupled to a preamplifier consisting of a single transistor stage (T1) with compound feedback (R2, R5). This load resistance (R3, R4) incorporates a potentiometer configured as a range control. Coupling (C1, C3) and bypass (C2) capacitors control the bandwidth.

Output from the preamplifier is coupled to two amplifiers consisting of integrated circuits together with appropriate biasing (R8, R9) and feedback (R6, R7, R10, R11) components. Amplifier bandwidth is controlled by means of coupling (C7) and feedback (C5, C8) capacitors.

Output of the amplified signal is presented to a first voltage comparator consisting of an integrated circuit and appropriate biasing components which produce the appropriate threshold (R13, R14) and hysterises (R15, R17). When the amplified signal exceeds this threshold (2 volts) the comparator provides an output pulse. The comparator response is cut at low frequencies by means of a capacitor (C10) and resistor (R16).

Output of this first comparator is fed to a pulse integrating capacitor (C11) via charge limiting resistors (R19, R20) configured as a sensitivity control. Also coupled to the first comparator output is a monitor socket via a current limiting resistor (R18) and diode (D2). This permits monitoring of detection range at the time of installation, permitting ease of setup and testing. A decay resistor (R21) is provided to reduce the count value stored on the integrating capacitor (C11) over a long period of time.

When the count value on the pulse integrating capacitor (C11) exceeds the threshold voltage of a second comparator, the output transistor (T2) will de-energise the output relay. The threshold and hysterisis of the second comparator are set by resistors (R23, R24, R26).

During the period when the relay is de-energised and causing an output activation, there is a forced reset condition. The pulse integrating capacitor is forcibly reset to zero count status via a resistor (R25) and diode (D5) to ready it for further detections. To prevent further detection pulses during this reset phase, the first comparator is prevented from operation by a diode ((D1) and resistor (R29). As an indication that the output has been activated, a diode (D4) is wired to cause continuous operation of the monitor throughout the reset phase, in contrast to the pulsing operation characteristic of the detection of movement. The period of time of this reset phase is determined by the value of the reset resistor (R25).

Not shown on the circuit diagram (FIGS. 4a and 4b) is the voltage regulator and filtering components to supply the amplifiers and oscillator.

I claim:

1. An intrusion movement detector comprising an oscillator means for generating a radio signal, an antenna means coupled to said oscillator means for transmitting a radio signal into an area to be surveyed by said detector, said antenna means exhibiting an initial radiation resistance relative to the position of objects (if any) in the area to be surveyed and a variable radiation resistance relative to the movement of an object in the area surveyed exclusive of reflected doppler signals resulting in a variable loading on said oscillator means, means for monitoring said variable loading such that when said variations in loading reach a predetermined threshold level, said monitoring means activates a signal or alarm means indicating detection of an intrusion or relocation of an object in the area surveyed.

2. A detector as claimed in claim 1 wherein said antenna means is loosely coupled to said oscillator means so that changes in loading or resistance of said antenna means does not influence frequency of transmission of said radio signal thereby resulting in high stability of the detector.

3. A detector as claimed in claim 1 wherein said oscillator is completely encased in a metal box, a socket, said socket coupling the antenna means and said oscillator whereby stray radiation of radio waves is prevented, said metal box forming an earth radiator of a co-axial dipole antenna with zero electric field inside.

4. A detector as claimed in claim 3 wherein said oscillator means includes an oscillator tank coil, a choke, a tuning capacitor and a feedback capacitor all formed as part of a printed circuit.

5. An intrusion responsive detector circuit comprising:
an oscillator having an output signal;
detector means coupled to said oscillator for varying said output signal;
a preamplifier;
bandwidth control capacitors for coupling said varying oscillator output signal to said preamplifier;
a potentiometer means coupled to said preamplifier for forming a range control for said detector;
at least one amplifier means coupled to said preamplifier for producing an amplified signal;
a first voltage comparator receiving said amplified signal at an appropriate threshold;
said first voltage comparator responding to said signal such that when said threshold is exceeded an output pulse is produced;
a sensitivity control means receiving said comparator output pulse;
a pulse integrating capacitor responsive to said sensitivity control means;
an alarm means; and
a second voltage comparator for receiving said output of said pulse integrating capacitor, said second comparator including means responsive to the voltage level stored at said pulse integrating capacitor for activating said alarm means when said stored voltage exceeds a predetermined threshold.

* * * * *